United States Patent [19]

Manalastas et al.

[11] Patent Number: 4,988,377
[45] Date of Patent: * Jan. 29, 1991

[54] COATINGS WITH SULFONATED POLYMERS

[75] Inventors: Pacifico V. Manalastas, Edison; Warren A. Thaler, Flemington; Evelyn N. Drake, Lebanon, all of N.J.; Israel S. Pasternak, Sarnia, Canada

[73] Assignee: Exxon Research and Engineering Company, Florham Park, N.J.

[*] Notice: The portion of the term of this patent subsequent to Oct. 20, 2003 has been disclaimed.

[21] Appl. No.: 387,059

[22] Filed: Jul. 31, 1989

Related U.S. Application Data

[63] Continuation of Ser. No. 855,349, Apr. 24, 1986, abandoned.

[51] Int. Cl.$^5$ .............................. C05C 9/00; C05G 3/10
[52] U.S. Cl. ...................................... 71/28; 71/64.02; 71/64.07
[58] Field of Search ........................... 71/28–30, 71/64.02, 64.07, 64.11, 64.12, 64.13

[56] References Cited

U.S. PATENT DOCUMENTS 4,701,204 10/1987 Duvdevani et al. .................... 71/28

Primary Examiner—Ferris H. Lander
Attorney, Agent, or Firm—R. E. Nanfeldt; J. Simon

[57] ABSTRACT

A composite comprising a substrate and an elastomeric coating adhered to at least one surface of said substrate, said elastomeric coating having a thickness of about 1 to about 100 micrometers, wherein said elastomeric coating comprises a neutralized sulfonated polymer having a sulfonate content of about 4 to about 200 meq. per 100 grams of said neutralized sulfonated polymer.

15 Claims, 1 Drawing Sheet

COATINGS WITH SULFONATED POLYMERS

This is a continuation of application Ser. No. 855,349, filed Apr. 24, 1986, now abandoned.

FIELD OF THE INVENTION

The present invention relates to elastomeric coatings having improved barrier properties wherein the elastomeric coating is formed from an organic solution of a sulfonated elastomeric polymer.

DESCRIPTION OF PRIOR ART

Solids (e.g., substrates, pipes, slabs, sheets, etc.) can be protected from the external environment with the use of barrier or protective coating materials. For protection from water or moisture, polymer or organic materials are widely used. For cost effectiveness, however, these materials are generally applied as thin films. The thickness of the film depends upon the desired degree of water protection. The thicker the film the more likely that water penetration would be slowed down. In practice, applying an effective thin coating is difficult because of the various stresses tending to make the film discontinuous (e.g., film-rupture, pin holes). Films will rupture when a threshold stress is exceeded The lateral stress tending to rupture a film is inversely proportional to an expotential power of the film thickness The thinner the film, the more easily it will rupture. To provide film strength current practice requires the establishment of crosslinks in the coating by curing. Crosslinking (curing) can also improve the coating's resistance to water. Thin films which consist of molecules in relatively random configurations with a high degree of entanglements are superior to films containing of molecules in relatively coiled states with few molecular entanglements. Accordingly, polymers containing associating ionic groups (ionomers) which have a high degree of molecular interactions should make excellent protective or barrier films.

There are many applications for thickened or gelled solutions of polymers in organic liquids which are quite diverse. There are also a number of physical and chemical techniques for preparing such systems. The present invention is concerned with an elastomeric coating having improved barrier properties.

Coatings which can be protective, decorative or special purpose are usually applied at thicknesses of as high as 50 micrometers or thicker in order to provide the desired properties required of such coatings. Higher thicknesses are required in order to compensate for coating defects or for poor coating material properties.

Coatings with improved properties may be applied as thin films having a thickness range of 1-100 micrometers, with a preferred range of 2-20 micrometers. In order for such coatings to be functional, they have to meet one or more of the following criteria: the coating material should show improved barrier properties; the applied thin coating should be a continuous film with few or no defects; and there should be a proper adhesion between the coated material and coating;

The material used in the thin film coating should have an optimized balance of properties, such as elasticity, toughness, hardness, abrasion resistance, etc., for durability under adverse conditions For special coatings, surface properties, such as surface tension or tribological properties, may need to be met.

The discovery of the film forming properties of sulfonated ionomers has made possible the extension of their use to coating applications, including controlled release products in agriculture (e.g., controlled release fertilizer). In controlled release fertilizer applications coatings of sulfonated ionomers will act as barriers to water soluble constituents of the fertilizer, shielding them from premature release in aqueous environments for periods ranging from several days to several months. Because of their unique barrier properties sulfonated ionomers can potentially be used to make cost effective controlled release fertilizers. The benefits obtained by the use of these coatings can include labor savings, increased crop yield, increased nitrogen utilization efficiency and time savings. The amount of premium is proportional to the cost of coating used on the controlled release product. Therefore, it is of economic importance to use as little coating material as possible to make a desirable agricultural product. The amount of coating which should be applied on the controlled release product, however, is not only dictated by economic considerations, but also by the required performance. In most cases the performance requirements include the control of the release or dissolving property of the agricultural material, achievable with the application of coatings free of fine pinholes or defects. Herein lies the major problem in controlled release fertilizer, particularly with existing conventional coatings, because the thinner the coating or the less coating material is applied the less likely that defect free coatings can be made. Thus, commercially available controlled release fertilizer products are with thick (>40 microns) coatings to yield acceptable performance (e.g., $\leq 20\%$ release of water soluble nutrient in seven days in water at 20° C.). As a consequence, these products are expensive and have found limited uses. With the discovery of sulfonated ionomer coatings, however, the application of thin ($\leq 20$ microns), defect-free films on controlled release fertilizer can now be achieved; thus, its use presents a potential route for making affordable controlled release fertilizer.

The instant invention teaches that a solution of a sulfonated polymer salt can meet many of the requirements for an improved thin film coating.

SUMMARY OF THE INVENTION

The present invention relates to a process for forming thin plastic elastomeric coatings having improved barrier properties from an organic solution of an organic liquid and a sulfonated polymer.

GENERAL DESCRIPTION

Figure 1:
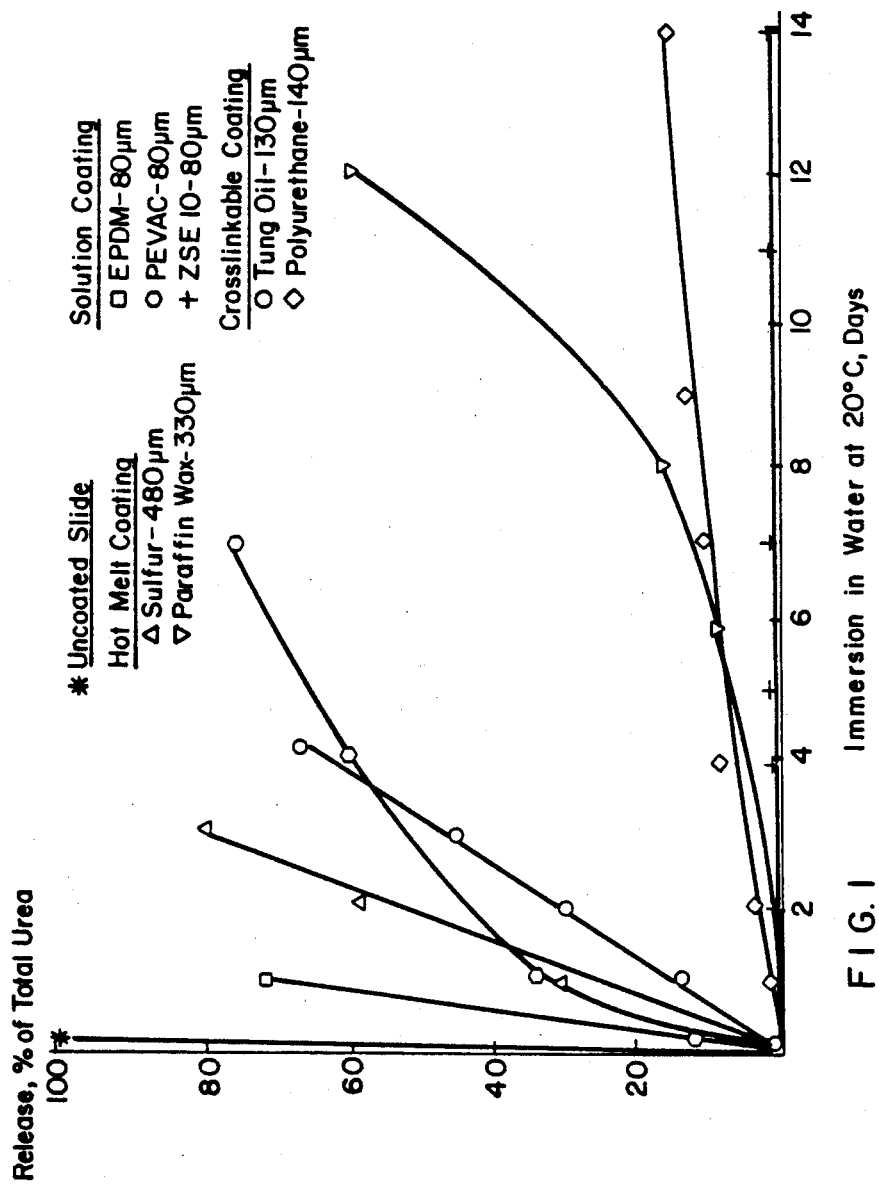
FIG. 1 illustrates a plot of release versus immersion time in water for the coatings of the instant invention and control samples.

The present invention relates to a process for forming an elastomeric coating having improved barrier properties from an organic solution of a sulfonated polymer.

The component materials of the instant process generally include a water insoluble sulfonated polymer dissolved in an organic solvent system to form a solution with a concentration level of 0.1 to 20 weight percent. The solvent system comprises an organic solvent with or without a polar cosolvent, such as alcohol or amine. The solvent can be an organic liquid which is capable of dissolving the polymeric backbone. A cosolvent may be needed to break up associated domains resulting from aggregation of ionic species.

The water insoluble sulfonated polymers of the instant invention will comprise from about 4 to about 200 milliequivalents of pendant sulfonate groups per 100 grams of polymer, more preferably from 10 to 100 meq. pendant sulfonate groups. In most instances, the sulfonates utilized in the instant invention are acids or are neutralized with transition elements selected from Groups IVA, VA, VIA, VIIA, VIIIA, IB and IIB of the Periodic Table of Elements and lead, tin and antimony, as well as ammonium and amine counterions. Sulfonated polymers which are subject to the process of the instant invention include both plastic and elastic polymers. Specific polymers include sulfonated polystyrene, sulfonated methylstyrene, sulfonated copolymer of styrene-t-butyl styrene, styrene-methyl styrene, styrene-isobutylene, sulfonated ethylene copolymers, sulfonated a tactic propylene polymers and propylene copolymers, sulfonated styrene/acrylonitrile copolymers, sulfonated styrene/methyl methacrylate copolymers, sulfonated block copolymers of styrene/ ethylene oxide, acrylic acid copolymers with styrene, sulfonated isobutylene isoprene copolymers (Butyl rubber), sulfonated ethylene-propylene terpolymers, sulfonated isoprene styrene or butadiene styrene-block copolymers and the sulfonated hydrogenated block copolymers. The preferred sulfonated polymers of the instant invention are ethylene-propylene terpolymers, Butyl rubber and polystyrene, wherein the ethylene-propylene terpolymers and polystyrene are most preferred.

Neutralization of the cited polymers with appropriate metal hydroxides, metal acetates, metal oxides, or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene, with acetyl sulfate as the sulfonating agent, such as described in U.S. Pat. No. 3,836,511, incorporated herein by reference. The resulting sulfonic acid derivative can then be neutralized with a number of different neutralization agents, such as sodium phenolate and similar metal salts. The amounts of such neutralization agents employed will normally be stoichiometrically related to the amount of free acid in the polymer, plus an unreacted reagent which is still present. It is preferred that the amount of neutralizing agent be equal to the molar amount of sulfonating agent originally employed plus 10 percent more to ensure full neutralization. The use of more of such neutralization agent is necessary to effect at least 50 percent neutralization of the sulfonic acid groups present in the polymer, preferably at least 90 percent, and most preferably essentially complete neutralziation of such acid groups should be effected.

Thus, the degree of neutralization of said sulfonate groups may vary from 0 (free acid form) to greater than 100 mole percent, preferably 50 to 100 mole percent With the utilization of neutralized sulfonates in this instant invention, it is preferred that the degree of neutralization be substantially complete, that is, with no substantial free acid present and without substantial excess of the base, other than that needed to ensure neutralization. The neutralized sulfonates possess greater thermal stability compared to their acid form. Thus, it is clear that the polymers which are normally utilized in the instant invention comprise substantially neutralized pendant groups and, in fact, an excess of the neutralizing material may be utilized without defeating the objects of the instant invention.

The sulfonated polymers of the instant invention may vary in number average molecular weight from 1,000 to 10,000,000, preferably 5,000 to 1,000,000, most preferably from 10,000 to 600,000. These polymers may be prepared by methods known in the art, for example, see U.S. Pat. No. 3,642,728, hereby incorporated by reference.

The preferred sulfonated polymers for use in the instant invention, which are sulfonated ethylene propylene terpolymers, may be prepared by the procedures described in U.S. Pat. No. 3,870,841, filed Oct. 2, 1972 in the names of H. S. Makowski, R. D. Lundberg and G. H. Singhal, hereby incorporated by reference.

The sulfonated polymers of the instant invention may be neutralized prior to incorporation into the organic solvent or by neutralization of the acid form in situ. For example, preferably the acid derivative is neutralized immediately after preparation. For example, if the sulfonation of an EPDM terpolymer is conducted in solution, then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the instant invention. It is well known that some unneutralized sulfonic acid derivatives do not possess good thermal stability and the above operations avoid that problem.

The concentration of the neutralized sulfonated polymer in the solution is about 0.1 to about 20 weight percent, more preferably about 0.5 to about 10, and most preferably about 0.5 to about 6.0. As discussed above, a variety of polymer backbones will display the desirable properties discovered in this invention.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylenedichloride, methylene chloride. |
| sulfonated poly-t-butylstyrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvent oils, such as Solvent "100 Neutral", "150 Neutral" and similar oils, benzene, diesel oil, toluene, xylene, ethyl benzene, pentane, hexane, heptane, octane, isooctane, nonane decane aromatic solvents, ketone solvents. |
| sulfonated styrene-methyl methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl sub- |

| Polymer | Organic Liquid |
| --- | --- |
| | stituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons. "Solvent 100 Neutral", "Solvent 150 Neutral" and all related oils, low molecular weight polymeric oils such as squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |

In order to reduce the viscosity of organic hydrocarbon solution of the sulfonated polymer so as to be able to employ the organic hydrocarbon solution in a casting process, a polar cosolvent may be added to the organic hydrocarbon solution of the sulfonated polymer to solubilize the pendant ionomeric groups The polar cosolvent will have a solubility parameter of at least 10.0, more preferably at least 11.0, and may comprise from 0.01 to 15.0 weight percent, preferably 0.1 to 5.0 weight percent, of the total mixture of organic liquid, water insoluble ionomeric polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting essentially of alcohols, amines, di- or tri-functional alcohols, amides, acetamides, phosphates, or lactones and mixtures thereof. Especially preferred polar cosolvents are aliphatic alcohols, such as methanol, ethanol, n-propanol, isopropanol, 1,2-propane diol, monoethyl ether of ethylene glycol and n-ethylformamide.

The elastomeric coatings of the instant invention are formed by applying the organic solution of the sulfonated polymer over the substrate at an ambient temperature or at 10-50° C., by either dip-coating or spray-coating or with the use of other techniques for thin spreading (such as brushing). The organic solvent system is then permitted to evaporate with or without the aid of forced drying gas, such as air or nitrogen gas. This step is called the drying process. The drying gas temperature can be from ambient temperature up to the boiling point of the organic solvent system. Preferably the temperature of the drying gas is between 20° to 100° C. The most preferred temperature of the drying gas should be about 70° C. for fast evaporation of the organic solvent system. After drying the thickness of the applied coating should be about 1 micrometer to about 100 micrometers. Most preferred, the coating thickness should be about 2 to about 20 micrometers for both performance and economic reasons. To control the thickness of the applied coating, the solution concentration of the sulfonated polymeric is applied at 0.5 to 6 weight percent. Most preferably, the concentration should be about 5 weight percent. The coating solution of the sulfonated polymer can be applied in single or multiple layers, depending on the desired coating thickness. In any instance, the organic solvent system is evaporated after each layer application. The sulfonated polymer coating can be applied over the substrate of interest or over a previous coating. In the latter case, such practice can modify or improve the performance of the coated system.

The sulfonated polymeric coating can be used as a barrier or controlled release coating for applications such as fertilizer, micronutrients or other solid materials.

Urea or other water soluble fertilizer granules can be coated to maximize the plant uptake of the applied fertilizer through the minimization of losses, including vaporization, nitrogen fixation and leaching. The coating of urea can be achieved by spraying a solution of sulfonated ionomer, such as zinc sulfo EPDM, onto a cascading stream of urea granules through an appropriate technique, such as fluidized bed coating. Examples of fluidized bed coating processes are: conventional spray coating wherein the solid particulates are coated by spraying the coating solution above or below the bed; a Wurster configuration; or a fluidized bed with a rotating bed support plate. It is envisioned that coated urea or other fertilizer particulates can be utilized in a variety of environmental conditions and yet the release of nitrogen or other water soluble nutrients can be controlled in such a way that they are available when the target plant (e.g., cereal) needs them.

DETAILED DESCRIPTION OF THE PREFERRED EMBODIMENT

The following Examples will demonstrate the performance of a sulfonated polymer as a barrier coating.

Example 1

Preparation of Sulfonated EPDM

A sulfonated EPDM terpolymer (TP-320) is prepared by sulfonating a 40 Mooney viscosity at 100° C. EPDM terpolymer (Royalene 521-Uniroyal) which has about 50 weight percent ethylene, about 5 weight percent ENB, with acetyl sulfate and neutralizing with $Zn(Ac)_2$ according to the procedure of U.S. Pat. No. 3,836,511, herein incorporated by reference, thereby producing 10 meq. of zinc sulfonate groups per 100 grams of the EPDM terpolymer and 25 meq. of zinc sulfonated groups per 100 grams of the EPDM terpolymer

Example 2

Improved Barrier Properties of an Interpolymer Complex Coating

A solution of the sulfonated EPDM polymer of Example 1 was prepared for application as a coating solution. The solution cast coating was applied over urea samples in order to measure the barrier properties for urea extraction by water through the thin film coating.

Solution A was prepared by mixing. The solution consisted of 2.5 grams of a zinc sulfo-EPDM similar to the one described in Example 1 (Uniroyal Ionic Elastomer 2560), containing 25 meq. of sulfonate groups per 100 grams of ethylene propylene ethylidenenorbornene terpolymer neutralized with zinc; in 100 grams of a solvent consisting of 97.5% toluene and 2.5% methanol reagent.

To determine the barrier properties of films formed from the solution of the sulfonated EPDM terpolymer, urea slides were coated for immersion tests. The procedures for preparing coated samples of urea slides and conducting immersion tests are described as follows:

Urea samples were prepared by depositing reagent grade urea (Fisher Scientific) over microscope glass slides. This was done by dipping glass slides into molten urea at a temperature of about 135-145° C., followed by cooling and solidification of the urea layer. The urea layer was built up to about 7 mm. by 4 to 5 successive dipping and cooling cycles. These urea samples were then coated by a polymeric film using a second dipping procedure. Urea slides were repeatedly dipped into polymeric solutions, such as those described above, followed by drying in a vacuum oven at 70° C. for about 3 hours. The dipping and drying cycles were repeated until the film thicknesses shown in Table I were obtained.

The barrier properties of the various polymeric films were determined by immersion of each coated urea slide in about 100 g. of deionized water at room temperature. The amount of urea released into the water was determined by recovering the urea after evaporating the water. Each sample was initially immersed for 1 day, followed by immersion in fresh water for 3 days and for weekly intervals thereafter.

Table I shows the permeabilities of urea solution extracted from the coated urea slides and immersed in water at room temperature The permeabilities of the coating materials were determined by applying Fick's law of diffusion at steady state. Fick's law states that:

$$J_m = DA \frac{C}{\delta}$$

where $J_m$ = mass flux (loss) through the film or membrane, A = transport area, C = concentration gradien $\delta$ = film or membrane thickness and D = membrane diffusivity constant which is equal to the ratio of permeability (P) over the solubility ratio (K) of urea in the membrane and in water.

The performance of the zinc-sulfo-EPDM film was compared with and those that formed from solutions of other commercial coating materials. The first commercial coating solution was a tung oil solution made by Formby of Mississippi at 30 weight percent solids in petroleum distillate. The second commercial coating solution was linseed oil modified polyurethane Type I made by Minwax Paint Co. of NJ at 45% solids in petroleum distillate. The two commercial coatings were cured at 70° C. for 48 hours after coating.

The permeability of urea solution through the zinc sulfonated EPDM terpolymer film was found to be about 3 order of magnitude lower than either that of tung oil or that of polyurethane. Note that tung oil and polyurethane were claimed as release control coatings for water soluble fertilizers (U.S. Pat. Nos. 3,321,298 and 3,223,518).

This Example shows that thin films of zinc sulfonated EPDM terpolymer complex provide a much better barrier than do commercial materials See Table I.

TABLE I

PERMEABILITY OF UREA SOLUTION FROM COATED UREA SLIDES IN WATER AT ROOM TEMPERATURE

| Sample No. | Coating Material | Ratio wt/wt | Film Thickness Microns | Permeability (P = DK) $cm^2$/sec |
|---|---|---|---|---|
| 141-3 | Tung Oil | — | 75 | $4.3 \times 10^{-9}$ |
| 141-6 | Tung Oil | — | 125 | $7.6 \times 10^{-9}$ |
| 158-4 | Polyurethane | — | 100 | $1.3 \times 10^{-9}$ |
| 158-5 | Polyurethane | — | 40 | $2.1 \times 10^{-9}$ |
| 28-14 | ZSE-25 | — | 10 | $9.6 \times 10^{-13}$ |
| 84-1 | ZSE-25 | — | 25 | $8.6 \times 10^{-13}$ |
| 84-2 | ZSE-25 | — | 30 | $8.6 \times 10^{-13}$ |

Example 3

FIG. 1 shows that ZSE-10 offered the best protection in preventing the dissolution of urea in water at room temperature (about 22° C.). Uncoated urea dissolved quickly in water, but even thick coatings of sulfur, unsulfonated EPDM and PEVAC on similar samples did not sufficiently protect urea from dissolving in water. Paraffin wax and modified polyurethane type 1 (made by Minwax Paint Company) protected urea from dissolving in water for at least six days. ZSE-10, however, performed the best in protecting urea from water dissolution. In this Example thick coatings of reagent sulfur and paraffin wax (M. P. = 55° C.) were applied through melting (i.e., these materials were melted at about 520 to 10° C. above their melting point and then after quickly dipping urea samples in the melt the hot coated sample was brought to room temperature slowly). This layering procedure was repeated three to four times to obtain a thick coating. Both unsulfonated EPDM and PEVAC were applied from 2.5% polymer solution in the same solvent as the solvent for the sulfo EPDM.

What is claimed is:

1. A composite comprising:
   (a) a substrate selected from the group consisting of a urea, a fertilizer and a micro nutrients; and
   (b) a polymeric coating adhered to at least one surface of said substrate, said coating having a thickness of about 1 to about 100 micrometers, wherein said elastomeric coating comprises a neutralized sulfonated polymer having a sulfonate content of about 4 to about 200 meq. per 100 grams of said neutralized polymers said coating being substantially free of pinholes.

2. A composite according to claim 1, wherein said sulfonate groups are neutralized with an ammonium or metal counterion.

3. A composite according to claim 2, wherein said metal counterion is selected from the group of transition elements and Groups IA, IIA, IB and IIB of the Periodic Table of Elements.

4. A composite according to claim 3 wherein said sulfonate groups are at least 90 mole percent neutralized.

5. A composite according to claim 2 wherein said neutralized sulfonated polymer is formed from an elastomeric polymer.

6. A composite according to claim 5 wherein said elastomeric polymer is selected from the group including EPDM terpolymer or Butyl rubber.

7. A composite according to claim 1 wherein said substrate is a fertilizer.

8. A composite according to claim 1 wherein said substrate is urea.

9. A composite according to claim 1 wherein said substrate is a micronutrient.

10. A composite according to claim 1, wherein said neutralized sulfonated polymer is formed from an elastomeric polymer.

11. A composite according to claim 10, wherein said elastomeric polymer is EPDM terpolymer.

12. A composite according to claim 11, wherein said substrate is urea.

13. A composite according to claim 1, wherein said coating comprises multiple layers of said polymer.

14. A composite according to claim 1, wherein said coating has a thickness of 20 microns or less.

15. A composite comprising urea coated with polymeric elastomeric coating having a thickness of 20 microns or less, wherein said elastomeric coating comprises a neutralized sulfonated polymer of EPDM having a sulfonate content of about 4 to about 200 meq. per 100 grams of said neutralized sulfonated polymer.

* * * * *